(12) United States Patent
Rivadeneira

(10) Patent No.: US 9,920,494 B2
(45) Date of Patent: Mar. 20, 2018

(54) ANIMAL WASTE VACUUM DISPOSAL AND BAGGING DEVICE

(71) Applicant: Oluyinka C. Rivadeneira, Hyattsville, MD (US)

(72) Inventor: Oluyinka C. Rivadeneira, Hyattsville, MD (US)

( * ) Notice: Subject to any disclaimer, the term of this patent is extended or adjusted under 35 U.S.C. 154(b) by 0 days.

(21) Appl. No.: 15/299,104

(22) Filed: Oct. 20, 2016

(65) Prior Publication Data
US 2017/0037589 A1 Feb. 9, 2017

Related U.S. Application Data

(63) Continuation-in-part of application No. 14/474,833, filed on Sep. 2, 2014, now abandoned.
(Continued)

(51) Int. Cl.
| | |
|---|---|
| *B08B 5/04* | (2006.01) |
| *E01H 1/08* | (2006.01) |
| *A01K 1/035* | (2006.01) |
| *A47L 7/00* | (2006.01) |
| *A47L 5/24* | (2006.01) |
| *A47L 9/14* | (2006.01) |
| *B01D 46/02* | (2006.01) |
| *E01H 1/00* | (2006.01) |

(Continued)

(52) U.S. Cl.
CPC ........... *E01H 1/0836* (2013.01); *A01K 1/035* (2013.01); *A47L 5/24* (2013.01); *A47L 7/009* (2013.01); *A47L 9/1436* (2013.01); *B01D 46/02* (2013.01); *E01H 1/006* (2013.01); *E01H 1/1206* (2013.01); *F21V 33/0044* (2013.01); *B01D 2265/00* (2013.01); *B01D 2275/203* (2013.01); *B01D 2279/00* (2013.01); *E01H 2001/0881* (2013.01); *E01H 2001/1226* (2013.01); *E01H 2001/1266* (2013.01)

(58) Field of Classification Search
CPC ..... E01H 1/0836; E01H 1/006; E01H 1/1206; E01H 2001/0881; E01H 2001/1226; E01H 2001/1266; A01K 1/035; A47L 5/24; A47L 7/009; A47L 9/1436; B01D 46/02; B01D 2265/00; B01D 2275/203; B01D 2279/00; F21V 33/0044
See application file for complete search history.

(56) References Cited

U.S. PATENT DOCUMENTS 4,185,355 A * 1/1980 Williams .................. A47L 5/24
15/344
5,771,531 A 6/1998 Swartz
(Continued)

*Primary Examiner* — Sharidan Carrillo
(74) *Attorney, Agent, or Firm* — Michael L. Greenberg, Esq.; Greenberg & Lieberman, LLC

(57) ABSTRACT

A solid pet waste vacuum and bagging device is described. The device is equipped with a canister, collection chute, vacuum motor, and a bag cartridge. The device eliminates the need for an individual to come into any contact with pet waste, including the temperature and the smell conventionally known to emanate from pet waste. The device employs the vacuum motor to collect pet waste within the bag via the collection chute. The collection chute is lined with a plastic bag, which is sealed and released from the collection chute within the canister upon activation of a dispose button by the user. The device is powered by rechargeable batteries, and may be equipped with a charging cradle to maintain a fully charged battery.

1 Claim, 4 Drawing Sheets

Related U.S. Application Data

(60) Provisional application No. 61/962,092, filed on Oct. 31, 2013.

(51) Int. Cl.
*E01H 1/12* (2006.01)
*F21V 33/00* (2006.01)

(56) References Cited

U.S. PATENT DOCUMENTS

| | | |
|---|---|---|
| 2006/0137132 A1 | 6/2006 | Oruber |
| 2009/0315350 A1 | 12/2009 | Allen |
| 2010/0139031 A1* | 6/2010 | Willmorth ............... A47L 9/02 15/347 |
| 2011/0308035 A1* | 12/2011 | Casper ................. A01K 13/001 15/344 |
| 2011/0309645 A1 | 12/2011 | Briscoe |

* cited by examiner

ANIMAL WASTE VACUUM DISPOSAL AND BAGGING DEVICE

CONTINUITY

This application is a continuation application of Utility patent application Ser. No. 14/474,833, filed on Sep. 2, 2014, which is a non-provisional application of provisional patent application No. 61/962,092, filed on Oct. 31, 2013, and priority is claimed thereto.

FIELD OF THE PRESENT INVENTION

The present invention relates to maintenance and cleaning products, and more specifically, those products designed to facilitate the cleaning and removal of animal fecal matter from an unwanted location on land or flooring.

BACKGROUND OF THE PRESENT INVENTION

Pet owners are well aware that pet ownership comes with certain responsibilities. Standard care practices of feeding, providing water, nurturing, and veterinary services are well known. Additionally, disposal of the pet's waste, especially the waste of dogs, is a chore of most pet owners. If the pet owner lives in a city or similar urban or suburban environment where large amounts of private land are uncommon, it is frequently required by law for pet owners to manually dispose of his or her pet's waste, especially if the pet defecates on public or government land.

Manually disposing of the pet's waste is unfortunate for the pet owner, as it requires additional labor to clean up, and the pet owner is potentially subject to contaminated fecal matter. Currently, there are two primary means of collecting pet waste for disposal—namely, a scoop, such as a conventional "PooperScooper," or simply a plastic bag in the hand of the pet owner.

Frequently, bag dispensers are sold to facilitate the release of a bag and to minimize the space occupied by the bags during the walk. Unfortunately, nearly all of the bag dispensers or bag set-ups still require the pet owner to physically pick up the pet's waste with his or her hand, the only protection on the hand being the bag. Many pet owners find the warmth of pet waste one of the larger drawbacks to collecting pet waste in this fashion. A claw or "PooperScooper" type of product can help to eliminate this, however it would require frequent cleaning, and the user is still required to remove the excrement from the claw, and place it into a bag. This process may cause the user to spill the bag, exacerbating the process, and potentially soiling the hands of the user.

Thus, there is a need for a device which can automatically pick up pet waste into a sealed bag without the pet owner coming into remote contact with the pet waste. Such a device preferably employs a bag cartridge system, enabling the user to install a bag cartridge to a rim of the device. The bag is preferably air-permeable, such that the suction of the vacuum employed is not diminished during use.

SUMMARY OF THE PRESENT INVENTION

The present invention is an animal waste vacuum disposal and bagging device. The present invention is configured to provide the user, preferably a pet owner or pet care provider, a practical, convenient, and sanitary means of collecting pet waste such as feces, without the need to ever come into contact with the waste. Via the present invention, it is envisioned that the user need not ever come into contact with pet waste. The present invention is configured to be convenient to carry along during a walk, and is preferably recharged between walks in order to keep the battery at full capacity.

The preferred embodiment of the present invention is equipped with a vacuum motor, bag (in communication with a bag cartridge), and a canister. The vacuum motor of the present invention is preferably activated via a power button which is pressed by the user at his or her will. The vacuum motor of the present invention is preferably housed within the canister, and provides suction to the bag. A suction exhaust vent is preferably present on the exterior of the canister. Upon activation of the vacuum motor of the present invention, the pet waste is suctioned into the canister, and is caught within the bag.

When the pet waste arrives within the bag, preferably of a proprietary design integrated into a bag cartridge, it is then promptly sealed via adhesive to eliminate the potential for odor or leakage from the bag. As such, the design of the bag cartridge is unique, and may not be replaced with a conventional plastic bag. After collection of the pet waste is completed, the user deactivates the present invention with the power button, and a door preferably seals over the rim of the collection chute of the canister, maintaining the bag and waste within the device. The user is now free to continue the walk with his or her pet. Upon arrival at a garbage can, the user presses a dispose button. The dispose button is preferably located next to the power button. Upon activation of the dispose button, the collection chute releases the full, sealed bag containing the pet waste into the garbage can.

A pet owner using the present invention would never be required to come into contact with fecal matter, and the pet owner could simultaneously rest assured that the pet waste had been properly disposed of, preventing health threats to members of the community, as well as other animals. The present invention is designed to be ideal for use by pet owners who reside in cities where city statures and laws require pet owners to remove of all pet waste created by pets. Use of the present invention by pet owners makes the process of pet waste disposal less embarrassing, safer, and easier.

DETAILED DESCRIPTION OF THE PREFERRED EMBODIMENT

Figure 1:
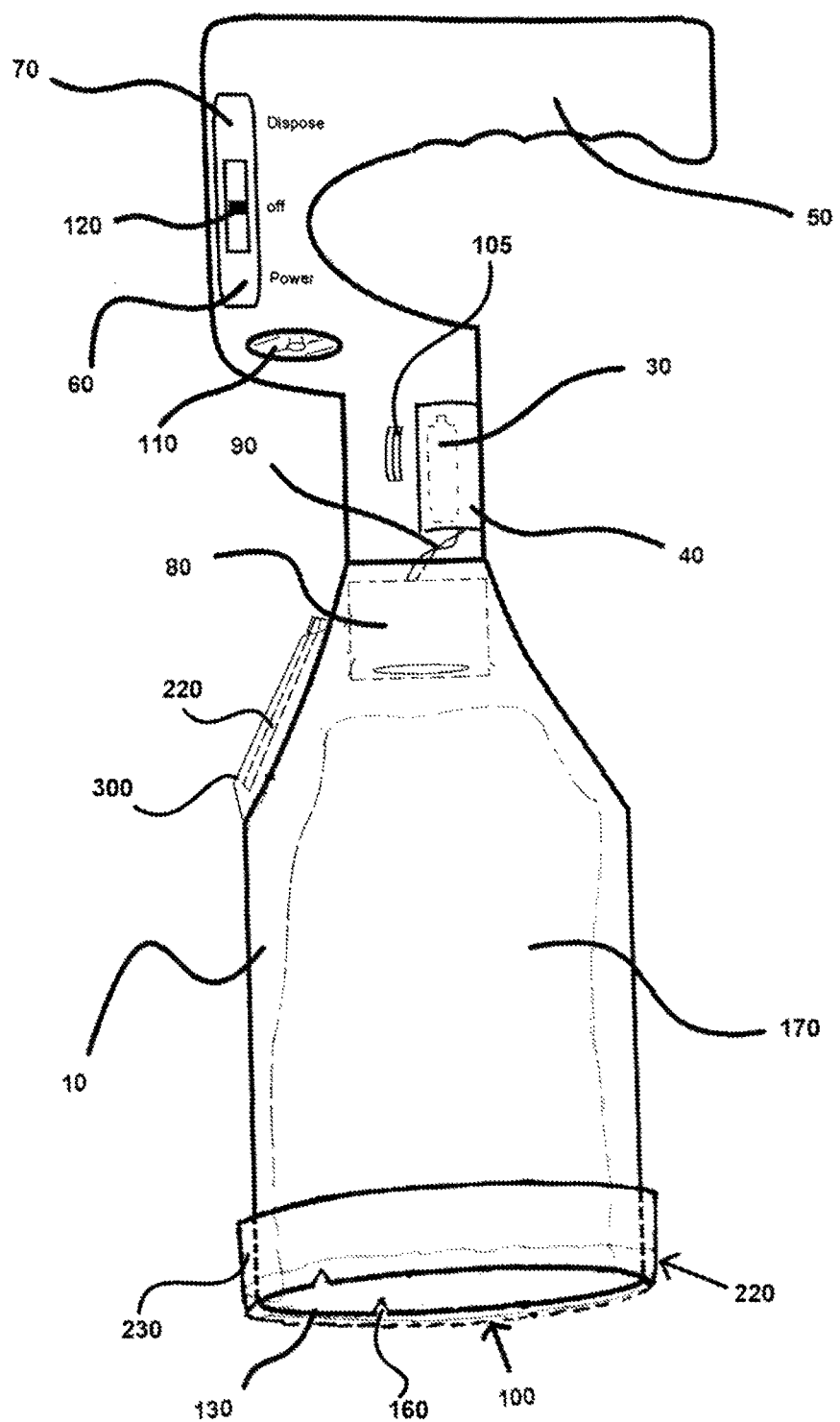
FIG. 1 shows the present invention as viewed from the side.

The present invention is an adjustable and adaptive vacuum and bagging device that facilitates the secure collection and transport of pet waste. The present invention facilitates the process of collecting and disposing of pet waste varying in size without the user ever having to touch the waste, nor the bag containing the waste, during neither the collection nor the disposal process. The present invention is preferably equipped with a canister (10), a bag (170) housed within a bag cartridge (220), a battery (30), a battery compartment (40), a handle (50), a power button (60), a dispose button (70), and a vacuum motor (80). The battery (30) of the present invention is preferably rechargeable, and is preferably recharged within the battery compartment (40) via an external, conventional AC/DC adapter. The handle (50) of the present invention is preferably equipped with a contoured grip. Some embodiments of the present invention may be equipped with a soft grip material or padding on the handle (50). The power button (60) is preferably disposed within reach of the handle (50), and is preferably configured to slide to be activated/deactivated, and may be integrated with the dispose button (70).

The vacuum motor (80) of the present invention is housed within the canister (10), near the battery compartment (40) as shown in FIG. 1. Power is supplied to the vacuum motor (80) via at least one wire (90) from the battery (30) when the power button (60) is activated by a user. The vacuum motor (80) is ideally rated to provide enough suction to lift several kilograms from a variety of surfaces, including but not limited to lawns, pavement, wood flooring, carpeting, soil, and other similar environments. The canister (10), as well as the bag cartridge (220), are preferably equipped with at least one small vent (160) to provide an avenue for the suction intake of the vacuum motor (80) to prevent any loss of suction. The vent (160) may have a triangular shape. It should be noted that the vent (160) amounts to a gap, and may also be present on the bag cartridge (220). The canister (10) of the present invention is preferably water-proof, in order to ensure lasting durability of the present invention. The canister (10) is preferably rectangular or cylindrical in shape. It is envisioned that the present invention may come in a variety of sizes, however it is hoped that one size of canister (10) is sized appropriately to handle most jobs.

Additionally, the canister (10) of the present invention is equipped with a handle (50) to facilitate use and transport of the present invention. The handle (50) preferably includes a flash light (110) integrated into the body of the handle (50). Some embodiments of the present invention may position the flash light (110) as integrated into the canister (10) itself, in order to emit light from within the collection chute (100). Additionally, the canister (10) is preferably equipped with at least one exhaust port (105) in order to provide a route for the vacuumed air to escape when it is pumped through the present invention via the vacuum motor (80). The front of the canister (10) is preferably equipped with a collection chute (100) which is capable of swiveling, and is potentially flexible. The collection chute (100) has a rim (130) that is rough or equipped with at least one triangle-shaped gap, shown as vent (160), configured to provide an avenue through which air can travel. The vents (160) are preferably present on the bag cartridge (220) as well. The collection chute (100) and the rim (130) are configured to interface with a bag (170) of a bag cartridge (220), which preferably attaches to the rim (130).

It should be understood that, upon activation of the suction, air is pulled into the body of the present invention, causing the bag (170) of the bag cartridge (220) to expand into the collection chute (100), lining the interior of the collection chute (100). The force of suction is not diminished greatly by the bag (170), as the bag (170) is composed of a loose fibrous material which is partially porous, similar to a conventional internal vacuum cleaner bag. As such, the bag (170) is air-permeable. This allows air to escape while maintaining the debris within the bag. Therefore, the bag (170) is preferably equipped with a very fine, mesh-like fabric, making it permeable to air. Preferably only one bag (170) is present within each bag cartridge (220). A conventional air outlet preferably exists as an exhaust for the vacuum motor (80), and is preferably disposed on the body of the canister (10).

Figure 6:
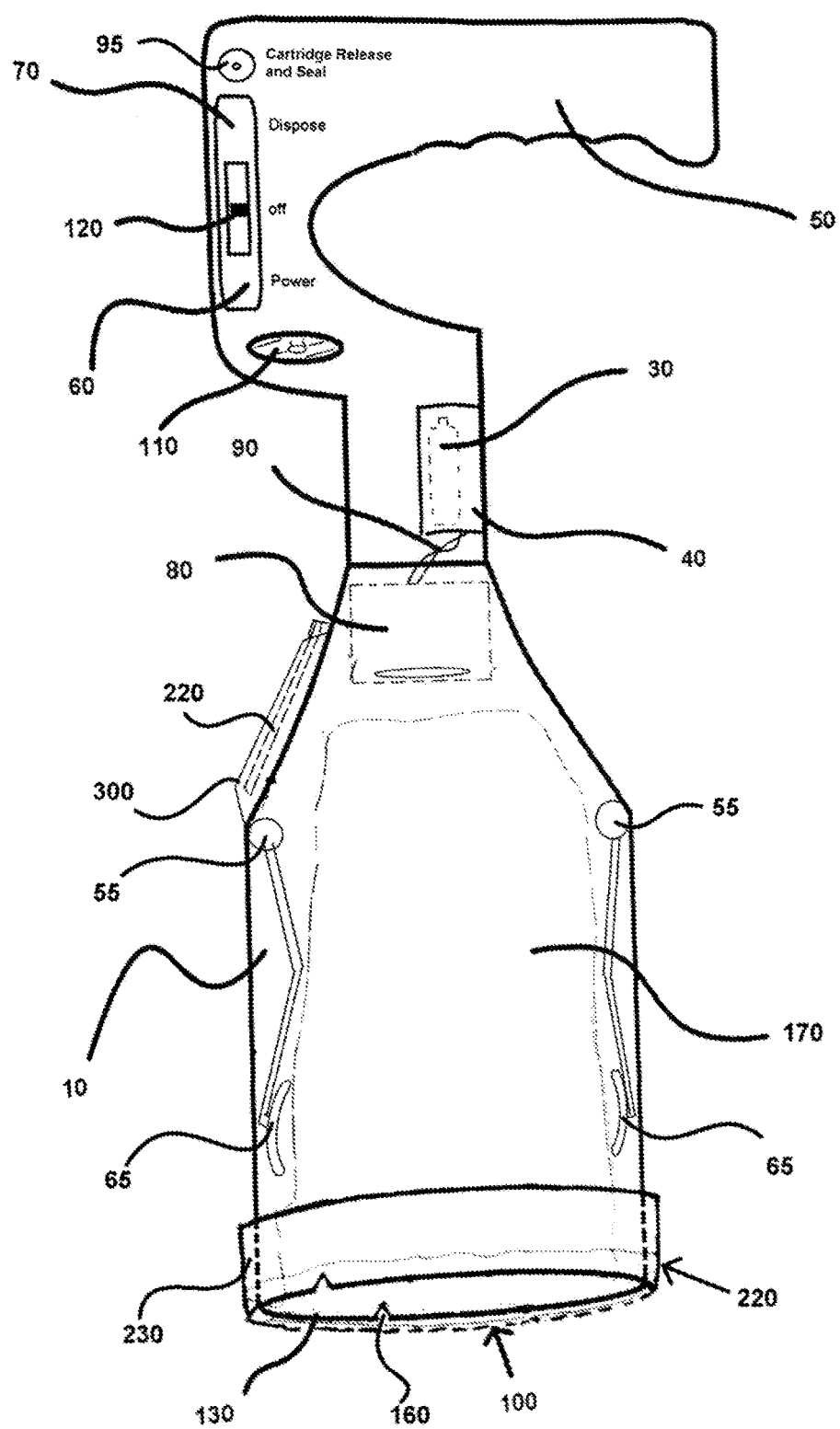
FIG. 6 shows a view of an alternate embodiment of the present invention, showing the internal clamp used to seal the bag within the collection chute after waste collection.

In the preferred embodiment of the present invention, prior to use of the present invention, the bag cartridge (220) is affixed to the rim (130) of the canister (10) near the tip of the collection chute (100). The bag (170) of the bag cartridge (220) that is deployed within the collection chute (100) is preferably equipped with a cardboard border (230) which is equipped with adhesive (180). Adhesive (180) is preferably present on the exterior of the cardboard boarder (230) in order to facilitate the sealing of the bag (170) after the waste is contained, and the boarder is mechanically turned up, similar to a shirt collar, orienting the elements of adhesive (180) such that they are opposite one another. After the application of suction to the solid pet waste, and the waste is brought into the bag (170), the cardboard border (230) is mechanically turned up, similar to a collar, such that the adhesive (180) is turned to face inwards. The border (230) is then compressed via an internal clamp (65) as shown in FIG. 6, such that the adhesive effectively seals the bag (170) prior to disposal, preventing the escape of odor and waste. A mechanical release and seal button (95) is preferably present to facilitate the pushing of the border (230) off of the rim, allowing the entirety of the bag (170) and bag cartridge (230) to be drawn into the collection chute (100) via suction, at which point it is sealed via the internal clamp (65) shown in FIG. 6. The internal clamp (65) is preferably composed of two separate clamp arms, which are each driven by a separate motor or an internal spring mechanism (shown as clamp mechanism (55)).

During use of the present invention, the user, namely a pet owner or pet care provider, locates the pet waste, potentially with the use of the flashlight (90). Then, the user affixes a bag cartridge (220) to the rim (130) of the collection chute (100) of the canister (10) by opening the bag cartridge (220) such that the border (230) is in the form of a circle (namely, the shape of the rim (130)), and slides the border (230) onto the rim (130), peels off the peel-away paper (190), and positions the collection chute (100) above the pet waste. Next, the user activates the device with the power button (60), activating the vacuum motor (80) of the present invention, which unfolds and draws in the bag (170) of the bag cartridge (220) into the interior of the collection chute (100) as shown in FIG. 1. Alternate embodiments of the present invention may be automatically activated when the canister (10) is pressed against the floor or a surface containing the waste to be picked up. In such embodiments, automatic activation is preferably facilitated via a contact button integrated into the rim (130), which causes activation of the vacuum motor upon contact with the ground or floor.

Figure 2:
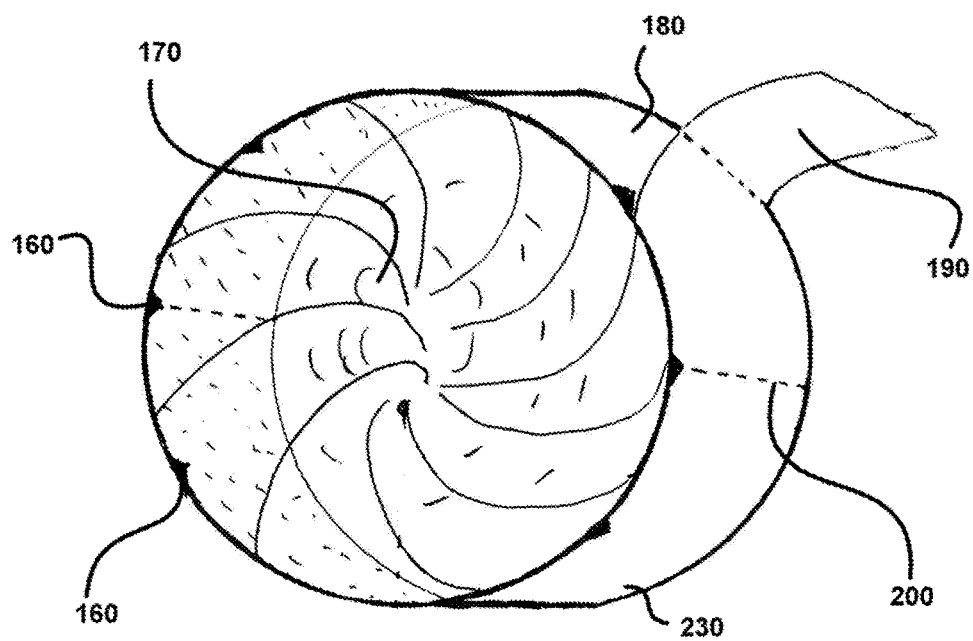
FIG. 2 exhibits a top view of the bag cartridge of the present invention.

The vacuum motor (80) creates suction which is directed to the pet waste via the collection chute (100), causing the pet waste to be suctioned into the bag (170). The bag (170) is preferably equipped with a paper-board or cardboard-based rim (referenced as border (230)) equipped with the adhesive (180), which helps to ensure that bag (170) of the bag cartridge (220) may be easily sealed after use. Additionally, the border (230) serves to effectively mount the entirety of the bag cartridge (220) to the rim (130) of the present invention, as it is configured to slide over the rim (130) as shown in FIG. 1. Peel-away paper (190) is preferably disposed atop the adhesive, which is preferably peeled off of the bag cartridge (230) after the bag cartridge (220) is installed on the rim (130) of the collection chute (100) by the user. Instantiations of the peel-away paper (190) covering the adhesive (180) of the present invention are preferably delineated with perforations (200) to facilitate removal of the peel-away paper (190), as shown in FIG. 2.

Figure 5:
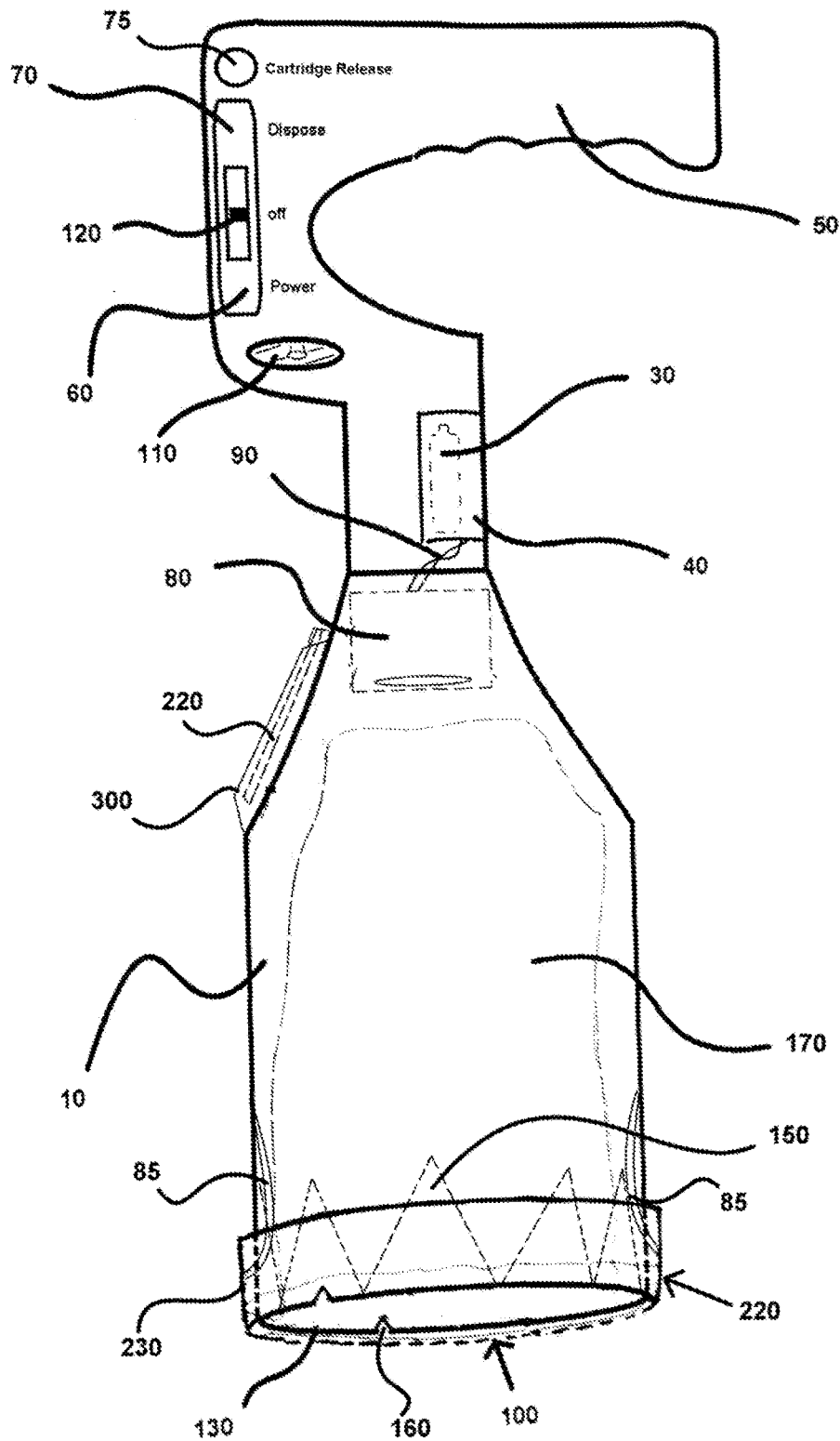
FIG. 5 depicts a view of an alternate embodiment of the present invention, showing a mechanical switch to facilitate separation of the bag cartridge from the rim of the collection chute.

The bag (170) contained within each bag cartridge (220) is preferably uni-directionally porous, similar to conventional vacuum bags. The user then preferably locates a garbage receptacle, such as a public trash can, or a trash can at the home of the user. With the collection chute (100) of the device placed over the garbage receptacle, the user activates the dispose button (70), releasing the sealed (via adhesive (180)) bag (170) containing the pet waste from the collection chute (100) and into the garbage receptacle. In some embodiments of the present invention, a door (150) is present across the rim (130) of the collection chute (100). The door (150) is preferably segmented into triangular segments, which form the shape of the collection chute (100) when closed. The door (150) preferably opens inwards as shown in FIG. 5, into the collection chute, and remains open until the bag (170) containing the pet waste has been drawn into the collection chute (100) for disposal.

Some embodiments of the present invention depict a door (150) of the canister (10) that pops closed, then open during the disposal process, after activation of the dispose button (70) by the user, facilitating an automatic sealing of the bag (170) via the adhesive (180) after the border (230) is flipped up, away from the collection chute (100), or is otherwise detached from the rim (130). In some of such embodiments, the adhesive (180) may be disposed on the interior of the cardboard border (230), rather than as shown in FIG. 2, which removes the need for the cardboard border (230) to be flipped in order for the bag (170) to seal via the adhesive (180). It is envisioned that, in no embodiment of the present invention is the user required to touch any portion of the invention other than the dispose button (70) and power button (60), ensuring that the user remains free of waste contaminants during and after use of the present invention.

In other embodiments of the present invention, the rim (130) itself is configured to twist about the collection chute (100), helping to free the border (230) from the rim (130) during disposal, and facilitate the sealing of the bag (170) via the adhesive (180) on the border (230).

The canister (10) may be equipped with a door disposed at or near the rim (130) of the collection chute (100) in some embodiments of the present invention, wherein the door (150) automatically opens when the power button (60) is activated, and seals shut when the power button (60) is deactivated. Such a door (150) would preferably also open upon activation of the dispose button (70), and seal again after the bag (170) has been sealed, ejected, and disposed of within a garbage receptacle.

Some embodiments of the present invention are configured with an external charging cradle to facilitate the charging of the battery (30) when the present invention is not in use. An external charging cradle is envisioned to be affixed to a wall or placed on a table near a door, potentially with the leash of the pet, in order to facilitate the process of 'walking the dog.' Additionally, some embodiments may include variations on the type of switch employed as a power button (60) and dispose button (70). For example, a neutral, off position of a slider-type switch may be employed as seen in FIG. 1, displaying an off switch (120). Additionally, in some embodiments of the present invention, a button may be present that reverses the flow of the suction to further facilitate ejection of the bag (170) during disposal. Similarly, the vacuum motor (80) may be configured to reverse upon activation of the dispose button (70).

Figure 3:
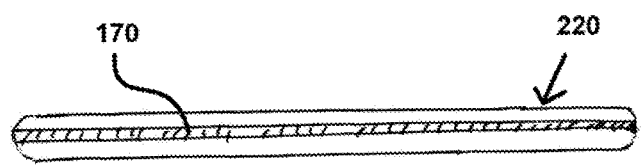
FIG. 3 displays a view of the bag cartridge of the present invention as seen from the side when flattened for storage.
Figure 4:
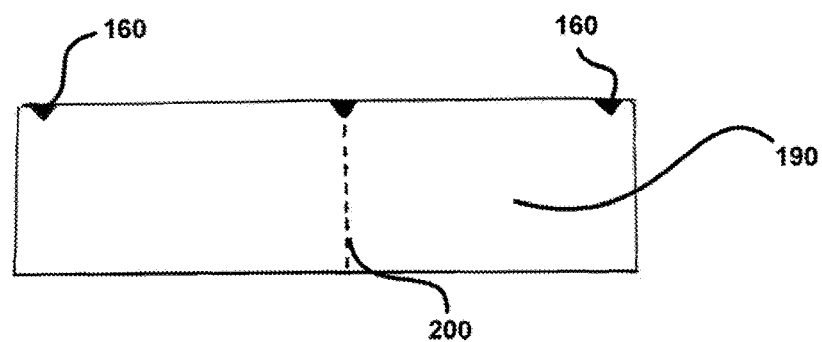
FIG. 4 shows a view of the bag cartridge of the present invention as seen from the bottom when flattened for storage.

Other alternate embodiments of the present invention are envisioned to have a narrow canister (10) and rim (130), while having a wider collection chute (100) in order to facilitate a more direct placement via suction of the waste into the bag (170). Such embodiments are preferably equipped with a door. Additionally, all embodiments of the present invention are preferably equipped with at least one pocket or compartment (300) disposed on the outside of the collection chute (100) in order to facilitate the storage of additional bag cartridges (220) in their folded state, as shown in FIG. 3 and FIG. 4. Each compartment (300) is preferably configured to hold at least one bag cartridge (220) for later use.

One alternate embodiment of the present invention employs industrial-strength suction, which facilitates the automatic flipping of the cardboard border (230) off of the rim (130) via suction alone. In such embodiments, the suction first draws the bag (170) into the collection chute (100), then draws the waste into the bag (170). With the suction still activated, the user releases a cartridge release button (75), which releases tension (which is provided via tensioners (85) that apply a spring-like outward force to the border (230) of the bag cartridge (220) to hold it in position, shown in FIG. 5) from the cardboard border (230), allowing the suction to draw the entirety of the border (230), bag (170) and waste into the collection chute (100) without the need for human contact. The force of this movement causes the adhesive (180) to adhere to the cardboard border (230), sealing the bag (170) closed. The door (150) then closes over the collection chute (100) (as the bag (170) is no longer affixed to the rim (130)), and the suction may be deactivated. This allows for the user to locate a trash can with the sealed bag (170) encased within the collection chute (100) behind the door (150). Upon locating a trash can, the user activates the dispose button (70), which opens the door (150), and allows the exit of the bag (170) containing the waste into the trash can without the user touching the bag (170) or trash can. Some embodiments may activate a reverse suction (blower) upon activation of the dispose button (70) to facilitate removal of the bag (170) from the collection chute (100) into the trash can without the need for human touch or intervention. It such embodiments, it is envisioned that the battery (30) may require recharging between uses.

Another alternate embodiment facilitates sealing of the bag (170) via a rotating mechanism disposed at or within the rim (130), which facilitates a twisting of the bag within the collection chute (100) shortly after the application of suction to the waste. Such embodiments employing this rotating mechanism preferably employ the cardboard border (230), which serves as a mount against which the rotation of the device may relatively rotate. The application of suction causes the rear or bottom of the bag (170) to remain in a relatively fixed position within the collection chute (100), and facilitates the sealing of the bag (170) via twisting the cardboard border (230) affixed to the bag (170) of the bag cartridge (220). Such embodiments preferably also employ a reverse suction (blower) to facilitate the easy removal of the sealed bag (170) from within the collection chute (100 upon location of a trash can.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application. Similarly, it should be understood that the depiction of the present invention in FIG. 1 embodies an example of a configuration of the essential elements of the present invention.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method for cleaning up solid pet waste into a bag via vacuum suction by a user without the user coming into contact with the bag nor the pet waste comprising:
   a) providing a pet waste vacuum having a handle and comprising a canister housing a vacuum, a collection chute, and a bag cartridge in communication with an air-permeable bag that lines an interior of the collection chute upon activation of a suction;
   wherein the collection chute comprises a segmented door disposed across a rim of the collection chute;
   wherein the vacuum is positioned at a closed end of the collection chute behind a bottom of the bag;
   wherein the handle is in communication with the canister and is disposed behind the collection chute and the bag;
   b) affixing a border of the bag cartridge containing the bag to the rim of the collection chute housed within the a canister;
   c) maintaining the border of the bag in position with the rim of the collection chute with hooks located within the collection chute that apply a spring-like outward force to the border of the bag to hold the border of the bag against the rim of the collection chute;
   d) locating the pet waste;
   e) gripping the handle;
   f) positioning the rim of the collection chute above the pet waste;
   g) positioning the rim of the collection chute on top of the pet waste, such that the pet waste is within the diameter of the rim;
   h) activating a power button powering the vacuum on, and directing suction at the pet waste to pull the pet waste into the bag through the collection chute;
   i) collecting the pet waste into the bag via the rim of the collection chute;
   j) releasing the border of the bag from the rim of the collection chute via the hooks so that the border is not held against the rim by any force;
   k) allowing the suction to draw the entirety of the border and bag into the collection chute;
   l) sealing the bag while the bag is inside the collection chute with adhesive disposed on the border without the need for human contact;
   m) deactivating the power button and powering the vacuum off;
   n) closing the door across the rim of the collection chute;
   o) locating a disposal bin; and
   p) pressing a dispose button to open the door and release the bag into the disposal bin.

* * * * *